United States Patent [19]

Wallquist et al.

[11] Patent Number: 5,476,886
[45] Date of Patent: Dec. 19, 1995

[54] POLYAMIDES MASS COLOURED WITH DIKETOPYRROLOPYRROLE PIGMENTS

[75] Inventors: Olof Wallquist; Bernd Lamatsch, both of Marly, Switzerland

[73] Assignee: Ciba-Geigy Corporation, Tarrytown, N.Y.

[21] Appl. No.: 276,278

[22] Filed: Jul. 18, 1994

[51] Int. Cl.$^6$ ............................................. C08K 5/3417
[52] U.S. Cl. ............................................................ 524/92
[58] Field of Search ................................................. 524/92

[56] References Cited

U.S. PATENT DOCUMENTS

| | | | |
|---|---|---|---|
| 4,231,918 | 11/1980 | Bäbler | 524/92 |
| 4,415,685 | 11/1983 | Iqbal et al. | 524/92 |
| 4,579,949 | 4/1986 | Rochat et al. | 546/167 |
| 4,659,775 | 4/1987 | Pfenninger et al. | 524/92 |

FOREIGN PATENT DOCUMENTS

| | | | |
|---|---|---|---|
| 0559611 | 9/1993 | European Pat. Off. | 524/92 |
| 0563901 | 10/1993 | European Pat. Off. | 524/92 |

*Primary Examiner*—Kriellion S. Morgan
*Attorney, Agent, or Firm*—Michele A. Kovaleski

[57] ABSTRACT

Mass-coloured synthetic polyamide containing, as pigment, at least one diketopyrrolopyrrole pigment of formula

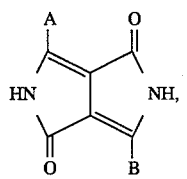

(I)

wherein A and B are each independently of the other a radical of formula

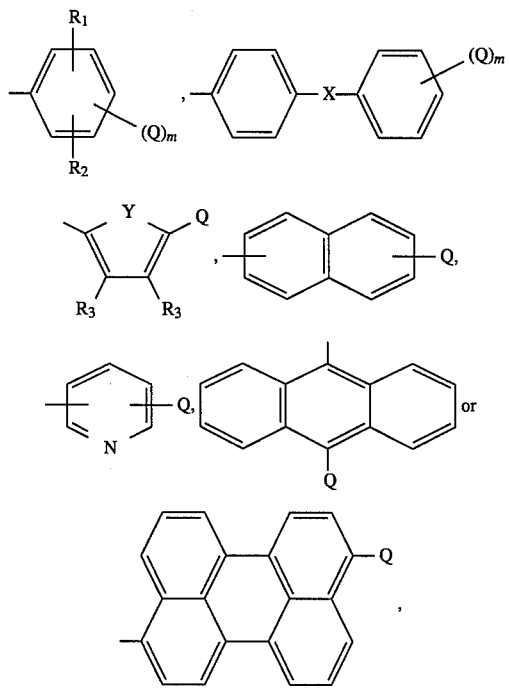

wherein
Q is a —CONH$_2$ group,
m is 1 or 2,
R$_1$ and R$_2$ are each independently of the other hydrogen, Cl, Br, CH$_3$ or C$_2$H$_5$,
R$_3$ is hydrogen, CH$_3$, C$_2$H$_5$ or phenyl,
X is a direct bond, —O—, —S—, —SO$_2$—, —CH=CH—, —CH$_2$— or —C(CH$_3$)$_2$—, and
Y is —O— or —S—.

Polyamides mass-coloured with the pigments useful in the practice of this invention have exceptional heat stability and excellent lightfastness.

3 Claims, No Drawings

POLYAMIDES MASS COLOURED WITH DIKETOPYRROLOPYRROLE PIGMENTS

The present invention relates to the mass colouration of synthetic polyamides with diketopyrrolopyrrole pigments containing carbamoyl groups.

The mass colouration of synthetic polyamides makes greater demands of the colourants than the mass colouration of other plastic materials. The melting points of synthetic polyamides are very much higher and also the chemical reactivity of the fused polyamides, especially of polyamide 66, is substantially greater, so that the colourants employed must have extremely good heat stability. There am few pigments that meet these exacting demands, particularly if superior lightfastness is additionally required.

Compared with other known diketopyrrolopyrrole pigments as disclosed, inter alia, in U.S. Pat. Nos. 4,415,685 and 4,579,949, the diketopyrrolopyrrole pigments containing carbamoyl groups used in the practice of this invention for colouring synthetic polyamides do not have any exceptional properties when used for colouring other plastic materials. Surprisingly, however, it has been found that they have an unexpectedly enhanced heat stability and quite outstanding lightfastness when used for colouring synthetic polyamides.

Accordingly, the present invention relates to mass-coloured synthetic polyamide containing, as pigment, at least one diketopyrrolopyrrole pigment of formula

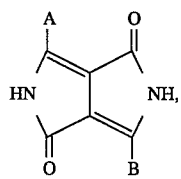

wherein A and B are each independently of the other a radical of formula

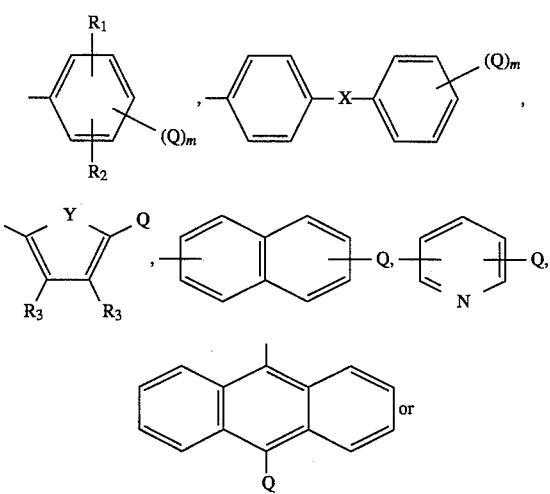

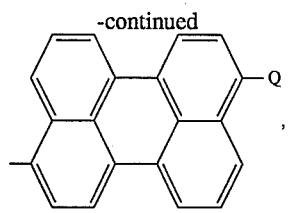

wherein
Q is a —CONH$_2$ group,
m is 1 or 2,
R$_1$ and R$_2$ are each independently of the other hydrogen, Cl, Br, CH$_3$ or C$_2$H$_5$,
R$_3$ is hydrogen, CH$_3$, C$_2$H$_5$ or phenyl,
X is a direct bond, —O—, —S—, —SO$_2$—, —CH=CH—, —CH$_2$— or —C(CH$_3$)$_2$—, and
Y is —O— or —S—.

Particularly suitable diketopyrrolopyrrole pigments of formula I are those wherein A and B are identical and are a radical of formula

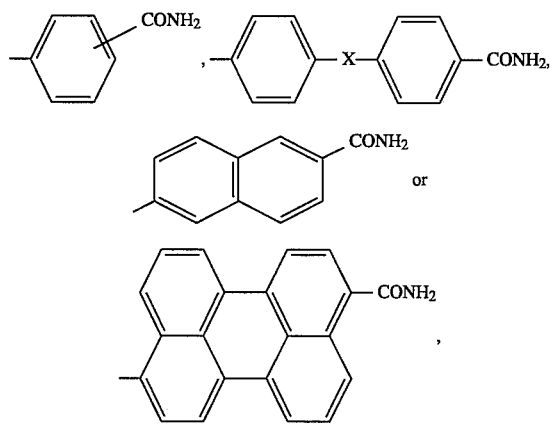

wherein X is a direct bond or —O—.

Preferred diketopyrrolopyrrole pigments are those of formula I, wherein A and B are identical and are a radical of formula

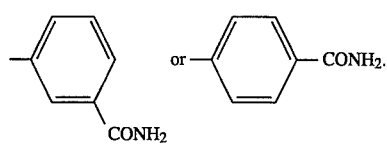

The pigments useful in the practice of this invention can be prepared by methods analogous to standard known ones, conveniently by treating compounds of formula I, wherein Q is CN, with concentrated sulfuric acid.

Synthetic polyamides which may suitably be used in the practice of this invention are those that may typically be prepared from ecaprolactam (Perion®, Nylon® 6), from ω-aminoundecanoic acid (Rilsan®), from hexamethylenediamine and adipic acid (Nylon® 66), or from analogous starting materials. Also suitable are copolyamides, typically of ε-caprolactam and hexamethylenediamine and adipic acid.

The eligible pigments are blended with the polyamide by known methods in solid form or in suspension, and the blend so obtained may be subjected to an intermediate drying.

It is preferred to coat the polyamides to be coloured, which are in the form of powders, granules or chips, with the dry pigment in powder form, i.e. to blend them mechanically such that the surface of these polyamide particles is coated with a layer of pigment. The pigment is conveniently in finely divided form. Instead of using the pure pigment, it is sometimes also possible to use with advantage preparations that comprise, in addition to the pigment, a heat-stable carrier that is compatible with polyamide, preferably a calcium or magnesium salt of a higher fatty acid, typically of stearic or behenic acid, and also polyethylene, polystyrene, polyesters and, naturally, polyamides or a mixture thereof. Such carders are disclosed, inter alia, in U.S. Pat. Nos. 4,093,584 and 4,279,802, GB patent 1 398 352 and CH patent 599 322. These granular preparations can be mixed with noncoloured polyamide granulate and further processed.

The polyamide particles coated with pigment are fused and spun or otherwise shaped by known methods to films or other moulded articles such as injection moulded parts (engineering plastics).

The pigment can also be incorporated in the fused polyamide before the melt is distributed to the spinnerets (injection process) and the coloured polyamide is thereafter spun or shaped.

The coloured polyamide preferably contains 0.01 to 10% by weight, preferably 0.1 to 3% by weight, of an eligible pyrrolopyrrole pigment of formula I.

The uniformly coloured objects so obtained are distinguished by superior fastness to light, shampooing, wet treatments, rubbing, chlorine, dry cleaning and, in particular, by superior heat-resistance, in certain cases by a high IR remission and also by good textile properties such as tear strength and elongation or, in the case of moulded parts, by good dimensional stability.

Owing to their good distribution in the polymer melt, the pigments suitable for use in the practice of this invention are uniformly and finely distributed in the coloured material.

The invention is illustrated by the following Examples in which, unless otherwise indicated, parts are by weight.

EXAMPLE 1

With stirring, 10 parts of the dry ground pigment of formula

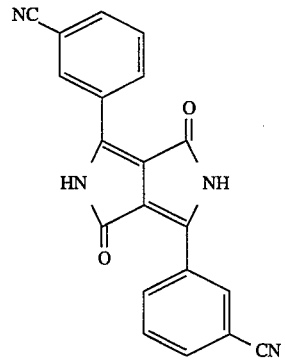

are charged at room temperature to 100 parts by volume of concentrated sulfuric acid (96%). The dark red solution that forms within 10 minutes is stirred for 16 hours at room temperature and then poured onto 800 parts by volume of ice (bulk volume). The resultant suspension is stirred with the toothed disc until the ice has completely melted and is then filtered. The residue is washed with water until neutral, suspended in 240 parts by volume of N-methylpyrrolidone and recrystallised by heating for 6 hours to 175° C. while simultaneously removing water by distillation. The crystals are isolated by filtration, washed with methanol and lyophilised, giving 8.5 parts (78% of theory) of the pigment of formula

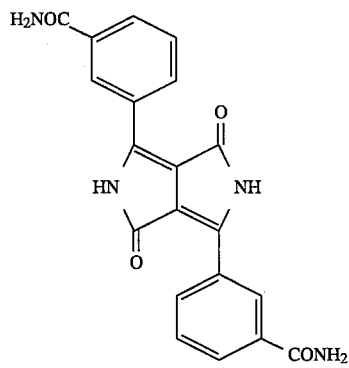

| Analysis: | C | H | N |
|---|---|---|---|
| calcd: | 64.17% | 3.77% | 14.97% |
| found: | 64.34% | 3.90% | 14.55% |

EXAMPLE 2

10 parts of the dry ground pigment of formula

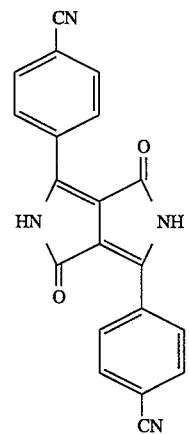

are charged at room temperature to 100 parts by volume of concentrated sulfuric acid (96%). The dark red solution that forms within 15 minutes is stirred for 18 hours at room temperature and then poured onto 800 parts by volume of ice (bulk volume). The resultant suspension is stirred with tile toothed disc until tile ice has completely melted and is then filtered. The residue is washed with water until neutral and subsequent drying gives 10 parts (92% of theory) of the pigment of formula

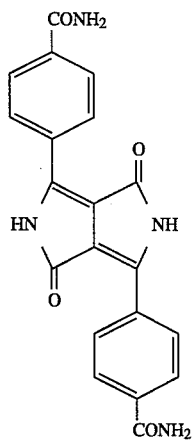

| Analysis: | C | H | N |
|---|---|---|---|
| calcd: | 62.66% | 3.94% | 14.61% |
| found: | 62.75% | 4.39% | 14.76% |

EXAMPLE 3

5 parts of the dry ground pigment of formula

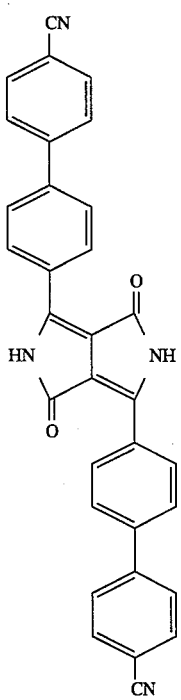

are charged at room temperature to 100 parts by volume of concentrated sulfuric acid (96%). The bluish-violet solution that forms within 30 minutes is stirred for 18 hours at room temperature and then poured into 400 parts by volume of ice/water. The resultant suspension is stirred with the toothed disc until the ice has completely melted and is then filtered. The residue is washed with water until neutral and subsequent lyophilisation gives 4.3 parts (82% of theory) of the pigment of formula

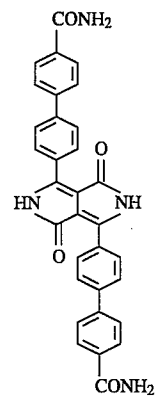

| Analysis: | C | H | N |
|---|---|---|---|
| calcd: | 71.76% | 4.33% | 10.46% |
| found: | 71.55% | 4.50% | 9.99% |

EXAMPLE 4

2 parts of the dry ground pigment of formula

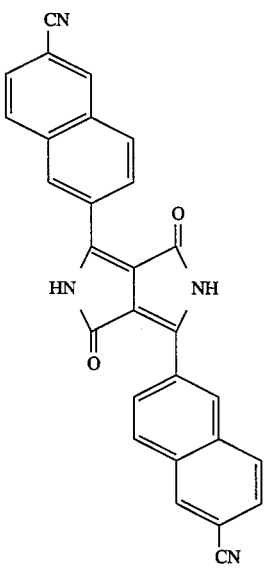

are charged at room temperature to 40 parts by volume of concentrated sulfuric acid (96%). The violet solution that forms within 30 minutes is stirred for 22 hours at room temperature and then poured onto 600 parts by volume of ice (bulk volume). The resultant suspension is stirred with the toothed disc until the ice has completely melted and is then filtered. The residue is washed with water until neutral and subsequent drying gives 2.15 parts (99% of theory) of the pigment of formula

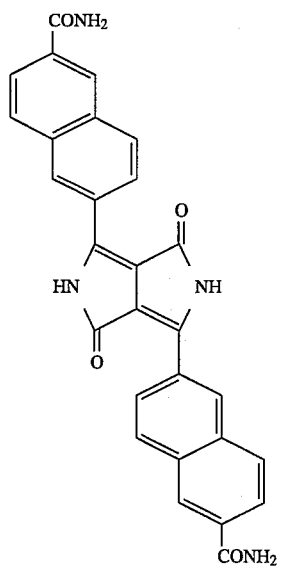

EXAMPLE 5

The pigment is synthesised as described in Example 1. The filter residue is likewise washed with water until neutral, suspended in 160 parts by volume of N-methylpyrrolidone and recrystallised by heating for 6 hours in an autoclave to 260° C. The crystals are isolated by filtration, washed with water and dried, giving 5.5 parts (50% of theory) of the same pigment as in Example 1 in coarse crystalline form.

EXAMPLE 6

975 parts of polyamide 66 (®Ultramid AS 2500 S supplied by BASF AG) are mixed dry in powder form with 25 parts of the pigment of Example 1 and the mixture is vacuum dried. The polymer so treated is fused at 280°–295° C. in an extruder and spun to filaments. The orange filaments have superior lightfastness.

What is claimed is:

1. Mass-coloured synthetic polyamide containing, as pigment, at least one diketopyrrolopyrrole pigment of formula

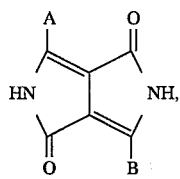

wherein A and B are each independently of the other a radical of formula

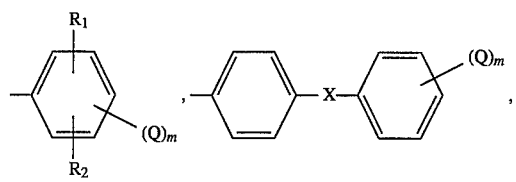

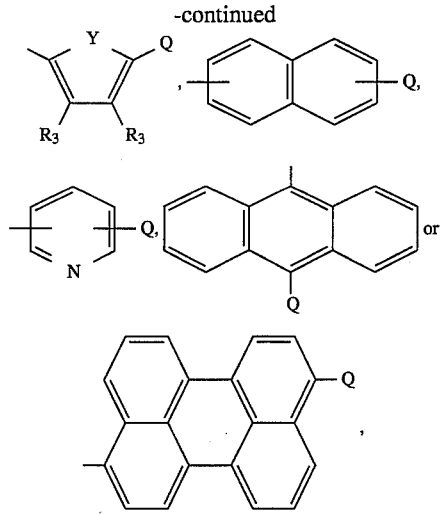

wherein

Q is a —CONH$_2$ group, m is 1 or 2,

R$_1$ and R$_2$ are each independently of the other hydrogen, Cl, Br, CH$_3$ or C$_2$H$_5$, R$_3$ is hydrogen, CH$_3$, C$_2$H$_5$ or phenyl, X is a direct bond, —O—, —S—, —SO$_2$—, —CH=CH—, —CH$_2$— or —C(CH$_3$)$_2$—, and Y is —O— or —S—.

2. A polyamide according to claim 1, containing as pigment at least one diketopyrrolopyrrole pigment of formula I, wherein A and B are identical and are a radical of formula

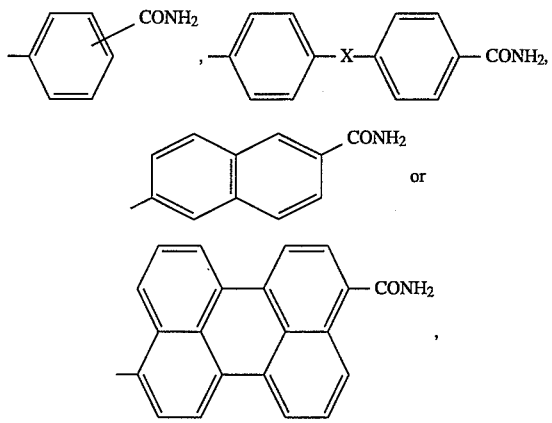

wherein X is a direct bond or —O—.

3. A polyamide according to claim 1, containing as pigment at least one diketopyrrolopyrrole pigment of formula I, wherein A and B are identical and are a radical of formula

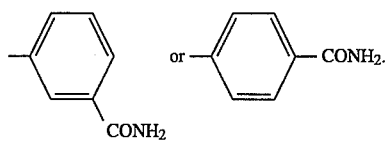

* * * * *